Patented Jan. 26, 1954

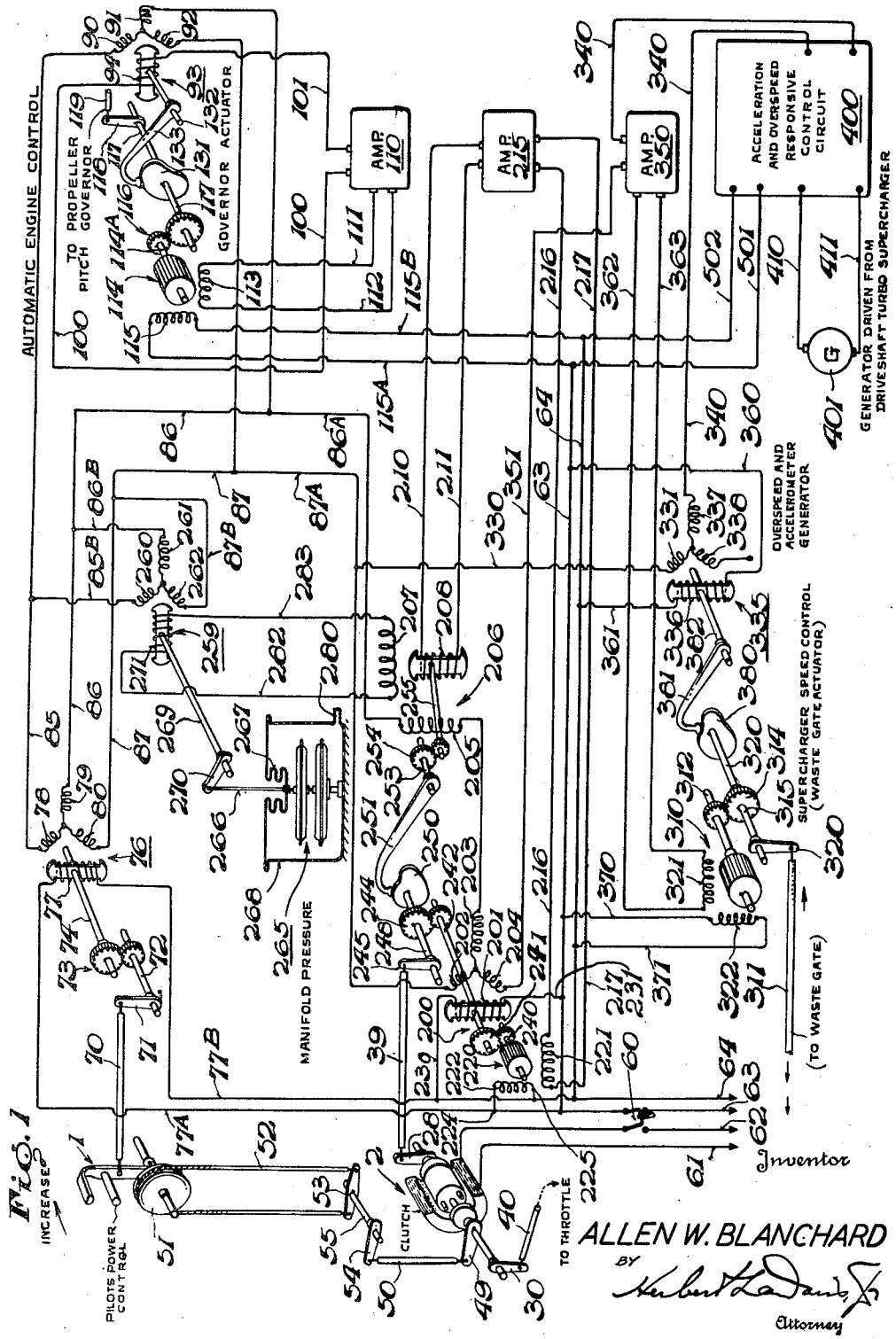

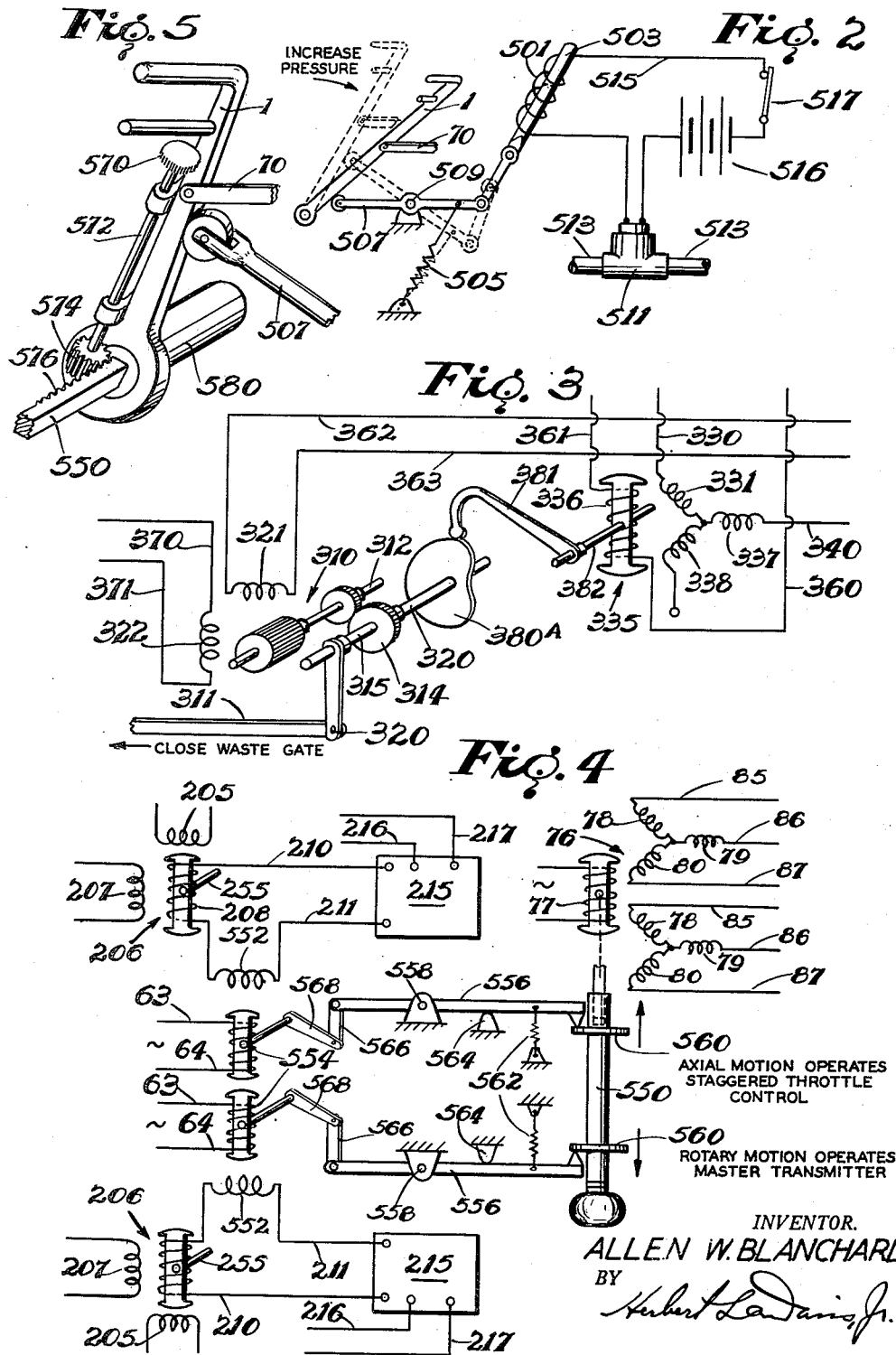

2,667,148

UNITED STATES PATENT OFFICE 2,667,148

ENGINE CONTROL DEVICE WITH AN INDUCTION PRESSURE RESET MECHANISM RESPONSIVE TO OPERATION OF AN ANTIDETONANT FLUID INJECTION SYSTEM

Allen W. Blanchard, Allendale, N. J., assignor to Bendix Aviation Corporation, Teterboro, N. J., a corporation of Delaware Application May 14, 1949, Serial No. 93,215

7 Claims. (Cl. 123—25)

The present invention relates to improvements in control systems and apparatus for the power units of aircraft of the type disclosed and claimed in the copending application Serial No. 561,083 filed October 30, 1944, by Joel D. Peterson.

With present aircraft supercharged engines the best performance is maintained only by adjustment of the various functions of the engine to values consistent with efficient and safe operation of the engine, with proper compensation for external factors such as the atmospheric pressure surrounding the aircraft, which pressure is directly affected by changes in the altitude of the aircraft. The functions of the power unit controlled are engine manifold pressure and engine speed. The manifold pressure is regulated through control of an induction throttle valve and the driving speed of the supercharger, while the engine speed is regulated usually by varying the pitch of the aircraft propeller through a propeller pitch governor control.

During the operation of so-called "water" or "anti-knock" fluid injection systems for suppressing predetonation in internal combustion engines, an increase in the air inlet pressure of the induction system for the engine is permissible and desirable in order that greater engine power may be obtained than when such injection system is not in operation. Therefore an object of the invention is to provide a novel electrically controlled solenoid to limit the manifold pressure to a safe "dry" range during non-operation of the fluid injection system while permitting higher manifold pressure settings by operation of the control lever during operation of the anti-knock fluid injection system. The electrically controlled solenoid is operated in conjunction with the water injection control system.

The above and other objects and features of the invention will appear more fully hereinafter from a consideration of the following description taken in connection with the accompanying drawings wherein several embodiments of the invention are illustrated by way of example.

Figure 1 is a diagrammatic illustration of the control system disclosed and claimed in the said copending application Serial No. 561,083.

Figure 2 is a diagrammatic view illustrating the novel pressure reset mechanism.

Figure 3 is a diagrammatic view illustrating the novel throttle valve position follow-up for the waste gate.

Figure 4 is a diagrammatic view illustrating the novel multi-engine control.

Figure 5 is a perspective view of a modified form of the control.

In order that the improvements forming the subject matter of the present application may be better understood, the electric control system shown in Figure 1 and heretofore disclosed and claimed in the said copending application Serial No. 561,083 filed by Joel D. Peterson will be first explained.

Referring in detail to the electric control system of Figure 1, there is provided a single lever and a compound clutch 2, whereby an induction throttle valve of an aircraft engine may be selectively connected either to an automatic control system or directly to the control lever 1 for manual operation.

The clutch 2 may be of a type such as shown in detail in the said copending application Serial No. 561,083, and includes an electromagnet which when energized operatively connects the arms 28 and 30, as shown in Figure 1.

The arm 28 is operably connected through a rod 39 to the automatic control mechanism, while the arm 30 is connected through a rod 40 to the throttle control valve. Thus upon energization of the electromagnet of the clutch 2, the throttle control valve is operably connected to the control system through the arms 28 and 30.

When the electromagnet 20 is de-energized, a spring biases the clutch so as to disconnect the arm 28 from driving relation with the arm 30 while drivingly connecting the arms 49 and 30. As previously explained, the arm 30 is connected through rod 40 to the induction throttle valve as shown in detail in the aforenoted application Serial No. 561,083.

Thus when the clutch 2 is de-energized, the automatic electrical control system is inoperative and the induction throttle valve may be manually adjusted through operation of the pilot's control lever 1. A double pole switch 60 is provided to energize or de-energize the automatic control system simultaneously with the electromagnet 20 through electrical conductors 61, 62, 63 and 64 so that the induction throttle valve may be automatically or manually controlled as desired. Moreover, it will be readily seen that as a safety provision upon a power failure the system will be automatically transferred by the de-energization of the electromagnet of the clutch 2 to manual operation.

The pilot's throttle control lever 1 is further suitably connected so as to effect selective electrical control of the automatic electrical control system. Thus the lever 1 is connected by an actuator rod 70 to an arm 71, which is operably connected through a shaft 72, a gear train 73, and shaft 74 to rotor 77 of an electrical induction type transmitter or transformer 76.

The transmitter 76 as illustrated hereinafter, comprises the rotor winding 77 which may be angularly displaced in relation to stator windings 78, 79 and 80 by the control lever 1, and the rotor winding 77 is arranged in inductive relation with the stator windings. Voltages are applied to the rotor winding 77 through electrical conductors 77A and 77B connected to conductors 63 and 64 leading from a suitable source of alternating current. Angular displacement of the transmitter rotor winding 77 causes the voltage applied to the rotor winding 77 to induce varying voltages in the stator windings 78, 79 and 80 of the transmitter 76 depending upon the relative position of the rotor winding 77. The voltages thus induced in the stator windings of the transmitter are applied through conductors 85, 86 and 87 to the stator windings 90, 91 and 92 of the propeller pitch governor actuator follow-up transformer or receiver 93.

PROPELLER PITCH GOVERNOR CONTROL

Rotatably mounted within the stator windings 90, 91 and 92 and in inductive relation therewith, is a rotor winding 94. If the winding 94 is not in a position in relation to the stator windings 90, 91 and 92 corresponding to a position at right angles to the induced field or the relative position of the rotor winding 77 to the stator windings 78, 79 and 80 there will be induced into the rotor winding 94 a voltage. The rotor winding 94 is connected through electrical conductors 100 and 101 to the input of an amplifier 110. The voltage induced into the winding 94 will cause an alternating current to flow to the amplifier 110, which is in phase or in phase opposition with the alternating current flow supplied through the conductors 63 and 64, depending upon the direction of the difference in the position of the rotors 77 and 94.

The amplifier 110 may be of any suitable type of torque amplifier well known in the art, or may be an amplifier of a type such as shown, for example in the expired Patent No. 1,586,233, dated May 25, 1926, and granted to H. Anschutz-Kaempfe. Electrical conductors 111 and 112 lead from the output of the amplifier 110 to a secondary or auxiliary winding 113 of a two-phase motor 114. A main winding 115 is connected through electrical conductors 115A and 115B which are connected to conductors 63 and 64 leading to the same alternating current source as the transmitter motor winding 77.

Thus if the rotor windings 77 and 94 are set in such a manner in relation to the stator windings that no voltage is induced into the winding 94 no current will flow in the auxiliary motor winding 113 of the two-phase motor 114 for there would be no alternating current flowing in the input circuit 100 and 101 of the amplifying unit 110. The motor 114 will therefore not operate for there is no rotating field.

When the rotor windings 77 and 94 are positioned at different angular relations to the stator windings from the null position, a voltage will be impressed on the winding 94, that is to say on the input circuit 100 and 101 of the amplifier 110, and the said voltage will be in phase or in phase opposition with the voltage supplied through the conductors 63 and 64.

The amplified current which flows in the auxiliary winding 113, will thus produce a corresponding field. Provision is further made in the amplifier 110, in a manner for example such as shown in the patent previously noted to H. Anschutz-Kaempfe, whereby the said auxiliary current or auxiliary field will have a phase displacement or difference of 90 degrees relative to the main current or main field, so that said fields form together a rotating field of sufficient magnitude to start the motor 114. It will depend on the phase direction of the alternating current voltage at the input of the amplifier 110 whether the auxiliary field will be displaced 90 degrees relative to the main field in the forward or backward direction or in other words, the direction or rotation of the rotating field will depend upon the direction of angular variation of the rotor winding 77 and 94.

The motor 114 is so arranged that if the receiver rotor 94 is not in a position corresponding to the null position for that of the transmitter rotor 77 an electrical signal is applied to the amplifier 110 which will feed power to the motor 114 to cause rotation of the receiver rotor 94 through a shaft 114A and interconnecting mechanical means, as will be explained, so as to bring the receiver rotor 94 to a position corresponding to the null position for the position of the transmitter rotor 77, whereupon the signal of the input circuit of the amplifier 110 will cease and rotation of the motor 114 terminate.

The rotor of the motor 114 is connected by the shaft 114A through a suitable gear train 116 and shaft 117 to an arm 118 to which is connected a rod 119 leading to a suitable propeller pitch governor control.

The rotor winding 94 follows up or measures for each corresponding change of position of the transmitter, the setting of the propeller pitch governor. The governor is actuated by the follow-up motor 114, and its ratio of movement is controlled by reduction gear train 116 and a cam 131, to thereby position the follow-up rotor winding 94 of the receiver 93 shown in Figure 1, so as to maintain proper relationship between the engine speed and manifold pressure, as will be explained. To provide for this ratio of performance there is provided a rotor shaft 132 on which is mounted a follower 133 which may be biased under suitable spring means not shown, into contacting relation with the cam surface of cam 131. The follower 133 is arranged to position the receiver rotor winding 94 through the motor 114 and cam 131 according to the movement of the pilot's control lever 1, until the position of the rotor 94 agrees with that of the transmitter rotor 77.

The cam 131 provides a non-lineal continuous smooth curve of actuation for the governor, not shown, and which co-acts with the selected position of the transmitter 76 to maintain proper speed relationships of the engine to those selected by the pilot.

Thus, as in the other follow-up motor arrangements of the several actuators hereinafter to be described, the rotor two-phase motor 114 in the governor actuator is energized and angularly positioned accordingly to a selected position of the master transmitter 76 to thereby actuate rod 119 through lever 118 mounted on cam shaft 117, until rotor 94 of the governor follow-up transformer 93 is angularly shifted to a null position for no voltage output to amplifier 100.

The rod 119 is connected to a propeller pitch governor control which may be of any suitable type well known in the art, or may be of a type shown in the said copending application Serial No. 561,083.

THROTTLE ACTUATOR

In addition to operating the propeller pitch governor control the positioning of the rotor 77 also controls the position of the induction throttle valve which regulates the induction pressure of the engine as will be explained.

As shown in Figure 1, there is provided a second receiver 200 which has a rotor winding 201 and stator windings 202, 203 and 204. The stator winding 202 is connected through electrical conductors 87A and 87 to the stator winding 80 of the transmitter 76, while the stator winding 203 is connected through electrical conductors 86A and 86 to the stator winding 79 of the transmitter 76. A high impedance inductive winding 205 is provided in the conductor 86A and the winding 205 forms one stator winding of an induction switch 206.

The induction switch 206 has a second inductive stator winding 207 which is preferably positioned at right angles to the inductive winding 205 so that when a rotor winding 208 of the induction switch 206 is positioned at right angles to the winding 207, as shown in Figure 1, the winding 208 will be inductively coupled with the winding 205 and there will be no inductive coupling between the winding 208 and winding 207. However, when the rotor winding 208 is positioned at right angles to the winding 205 the winding 208 will be inductively coupled to the winding 207 and there will be no inductive coupling between the winding 208 and the winding 205.

The rotor winding 208 is connected by electrical conductors 210 and 211 to the input of an amplifier 215 of similar type to the amplifier 110 previously described. The amplifier 215 has output conductors 216 and 217 in which is inserted one of the two windings of two-phase motor 220 and which winding will be hereinafter described as secondary winding 221. The main winding 222 is connected through electrical conductors 224 and 225 to the alternating current conducted through conductors 63 and 64. The rotor winding 201 of the receiver 200 is connected through electrical conductors 230 and 231 with said source of alternating current and is rotatably positioned in relation to said stator windings 202, 203 and 204 by said motor 220, as will be explained.

As shown in Figure 1, the stator windings 79 and 80 of the transmitter 76 together with the electrical conductors 86, 87, 86A, 87A, stator winding 205 of induction switch 206 and stator windings 202 and 203 of the receiver 200 provide a closed circuit.

There is induced in this closed circuit through the alternating current flowing in the rotor winding 77 a first voltage and through the alternating current flowing in the winding 201 a second voltage which tends to oppose the first voltage. If the rotor winding 77 be positioned at a different angular relation to the stator windings 78 and 80 and the rotor winding 201 is positioned in relation to the stator windings 202 and 203, it will be readily seen that a greater or less voltage will be induced in the closed circuit by the one than by the other. The difference between these induced voltages will effect a current flow through the high impedance windings 205.

Thus in the event the rotor inductive winding 208 of the switch 205 is positioned in inductive relation to the stator winding 205 a corresponding voltage will be induced in the winding 208, which upon amplification by the amplifier 215 will cause an alternating current flow in the auxiliary winding 221 of the two-phase motor 220; such current flow will have a phase displacement or difference of ninety degrees relative to the main winding 222, so as to effect rotation of the motor 220. The direction of rotation of the rotating field will depend upon whether the voltage induced into the closed circuit by one or the other of the rotor windings 77 or 201 be greater; the motor 220 being so arranged as to move the rotor winding 201 in a direction relative to the stator windings 202 and 203 so as to cause the voltages induced into the said circuit to equalize, whereupon no current will flow in the winding 205 and rotation of the motor 220 will terminate. The motor 220 drives the rotor winding 201 through a suitable driving means including shaft and reduction gearing 240. The motor 220 also drives through shaft 242, gear train 244, shaft 248 and arm 245, the rod 39 and arm 28 of the electromagnetically operated clutch 2. The motor 220 upon energization of electromagnet of clutch 2 controls the position of the induction throttle valve. The motor 220 also drives through shaft 248, a cam 250.

An arm 251 rides in contacting relation along the cam surface of the cam 250 under suitable biasing means, such as a spring tension means, not shown. The arm 251 is drivingly connected through a shaft 253, suitable gear train 254, and shaft 255 to the rotor 208 of the induction switch 206 so that upon rotation of cam 250 to a position where the arm 251 rides on raised portions of the cam 250, the rotor 208 will be shifted to a position at right angles to the winding 205 and in inductive relation to winding 207.

It will be readily seen, that with the rotor 208 of the induction switch 206 positioned in relation to the inductive winding 205, the motor 220 effects a follow-up of the position of the transmitter rotor 77. Thus movement of the rotor 77, in a counter-clockwise direction, will effect a corresponding follow-up clockwise movement of the winding 201 and counter-clockwise movement of the cam 250 until a shifting of the induction switch rotor winding 208 in response to movement of the control lever 1 is effected so as to place the winding 208 in non-inductive relation with the winding 205 and in inductive relation with the winding 207. Such counter-clockwise movement of the cam 250 will of course effect a corresponding counter-clockwise movement of the arm 245 affixed to the shaft 248 so as to progressively open the throttle valve through rod 39, arm 28, clutch 2, arm 30 and rod 40.

The cam 250 is so arranged that the direct motion follow-up of the rotor 77 is effected for a predetermined range of movement of the throttle valve, such as, for example from full closed position to thirty per cent open throttle position. At the latter predetermined position, the cam 250 will begin shifting the induction switch rotor winding 208 to a position out of inductive relation with winding 205 and into inductive relation with winding 207. The action may take place for a predetermined range of movement of the throttle valve, for example from thirty per cent to thirty-five per cent open position of the throttle valve.

MANIFOLD PRESSURE CONTROL

Upon the rotor winding 208 being shifted to a position in inductive relation with the winding 201 the control of the throttle shifts from a position follow-up to a manifold pressure follow-up.

The manifold pressure control includes a receiver transformer 259 having the stator windings 260, 261 and 262 which are connected in parallel with the transmitter stator windings 78, 79 and 80 and the receiver transformer 93, stator windings 90, 91 and 92 through electrical conductors 85B, 86B and 87B connected respectively to the conductors 85, 86 and 87.

The manifold pressure follow-up arrangement for maintaining the engine manifold pressure in accordance with the pilot's selected pressure comprises a two-celled evacuated bellows 265, a take-off rod 266, and a bellows seal 267 for sealing the shaft opening in the casing 268. The rod 266 is connected by arm 270 and shaft 269 to the single phase rotor 271 of the receiver transformer 259. The casing 268 is sealed and connects to the intake manifold of engine 4 by conduit 280.

Thus when the evacuated diaphragm 265 collapses, as the pressure at the intake manifold increases a resulting pull is exerted on rod 266, thereby moving rotor winding 271. Now, if the pressure selected by control lever 1 connected to transmitter 76 is different from the then existing engine manifold pressure, there is a voltage induced in the rotor 271 due to its angular relationship to the resultant field produced in the stator windings 260, 261 and 262. Accordingly, if the position of the rotor 271 which is determined by the engine manifold pressure in relation to the stator windings 260, 261 and 262 corresponds to the null position, there will be no voltage induced in the rotor 271. However, if the rotor windings 271 is not at a null position relative to the position of the rotor winding 77 a voltage will be induced in the rotor 271, the phase of which is determined by the direction of the difference in the relative positions of the rotor winding 77 and 271. The voltage so induced in the rotor 271 is applied through conductor 282 and 283 to the stator winding 207, this induces a corresponding voltage in the rotor winding 208 of the inductive switch 206 causing a flow of alternating current through conductors 210 and 211 to the input of the amplifier 215.

As previously explained, output conductors 216 and 217 lead from the amplifier 215 to the secondary winding 221 of motor 220. The main winding of the motor 220 is connected to the constant source of alternating current by conductors 224 and 225, the phasing between these voltages is such that the motor angularly positions the throttle in such a direction that the resulting increase or decrease in the manifold pressure turns the rotor winding 271 toward the null position to agree with the pressure change.

Thus it will be seen that the throttle is adjusted by the motor 220 so as to maintain a pressure in the intake manifold as selected through manual operation of the control lever 1. Moreover such selected pressure is increased by movement of the control lever 1 in a clockwise direction and transmitter rotor 77 in a counter-clockwise direction, requiring a corresponding counter-clockwise movement of the rotor 271 to balance the transmitter rotor 77.

After the throttle has been initially opened to a position in excess of a predetermined degree of say eighty per cent, then a further call for an increase in the intake manifold pressure through operation of rotor winding 271 will cause operation of a supercharger as will be explained.

Operation of the supercharger will cause the intake manifold pressure to be increased and as a result the pressure member 265 will again apply voltage to the throttle actuator motor 220 to return the throttle valve to the eighty per cent reference position.

SUPERCHARGER CONTROL

In the event the throttle valve has been opened to the predetermined degree of eighty per cent upon a further call for increase in the intake manifold pressure the further opening of the throttle valve will effect operation of an auxiliary supercharger.

The auxiliary supercharger may be driven by suitable driving means such as a turbine driven by the exhaust gas from the engine and applied through an exhaust conduit. The auxiliary supercharger has an air inlet conduit which may be connected to an air scoop in a conventional manner.

There is further provided an air conduit leading from the outlet of the auxiliary supercharger to the inlet of a main supercharger driven by the crank shaft of the engine. The speed of rotation of the supercharger and the turbine is controlled by a waste gate in a manner well known in the art. Any other suitable driving means for the supercharger may be provided instead of the turbine such as an auxiliary variable speed motor means of any suitable type. In the instant case the waste gate is controlled by a motor 310 through a rod 311. The motor 310 being connected to the rod 311 by a shaft 312, train of gears 314, and shaft 315 connected to an arm 320 to which the rod 311 is operably connected. Motor 310 is of a reversible two-phase type, such as previously described having a secondary winding 321 and a primary winding 322. Operation of the motor 310 is controlled by the transformer 200 having rotor winding 201 and stator windings 202, 203 and 204, as previously explained.

A conductor 330 leads from the stator winding 202 through conductor 87A to a stator winding 331 of transformer 335. The transformer 335 has stator windings 331, 337 and 338, the stator winding 331 is connected to the stator winding 337 and by electrical conductor 340 through an acceleration over-speed responsive device, as disclosed in the said copending application Serial No. 561,083, to the input of an amplifier 350 of similar type to amplifiers 110 and 215.

Conductor 351 leads from the stator winding 204 of the transformer 200 to the input of the amplifier 350. A rotor winding 336 of the transformer 335 is connected by conductors 360 and 361 to the conductors 63 and 64 leading from the main source of alternating current.

The rotor 201 is so arranged in relation to the stator windings 202 and 204 of the transformer 200 that upon the throttle being positioned by the motor 220 to a position less than a predetermined null position of, for example, eighty per cent open, a combined voltage will be induced into the windings 202 and 204 which will be opposed to the combined voltage induced into the windings 331 and 337 by the alternating current in the transformer 335. The difference between such combined voltages will cause a flow of current to the input of the amplifier 350 and through output conductors 362 and 363 to the secondary winding 321. The said current in the winding 321 having such a phase relationship with the alternating current flowing in the main winding 322 as to tend to rotate the motor 310 in a direction opening the waste gate 305.

In the initial adjustment of the throttle valve from a closed position, the waste gate will be held in an open position by this action of the motor 310 until the null point of the throttle valve of say eighty per cent open has been passed.

When the throttle 3 has been adjusted to a position in excess of the null point, the combined voltage induced in the windings 331 and 337 and that induced in the windings 202 and 204 by the alternating current in the winding 201 will have an opposite difference. Such predominating voltage will cause a flow of current to the input of the amplifier and to the secondary winding 321 opposite to that previously described and the current flowing in the secondary winding 321 will be of a phase sufficient to initiate operation of the motor 310 in a direction for closing the waste gate.

There is also affixed to the shaft 320 a cam 380 on the cam surface of which rides a cam follower arm 381 which adjusts through a shaft 382, the rotor winding 336 of the transformer 335. The cam surface of the cam 380 is such that the cam 380 adjusts the rotor winding 336 only within an initial closing range and an extreme closing range of the waste gate 305. The winding 336 thus provides within these limited ranges a follow-up responsive to the position of the throttle valve whereby there is induced into the stator winding 331 and 337 a voltage which will be equal to the voltage induced in the stator windings 202 and 204 by the rotor winding 201 at corresponding positions of the rotor windings.

Between these two extreme ranges, control of the speed of the supercharger will be controlled by the position of the throttle valve to one side or the other of the null point in response to the operation of the pressure responsive member 265 controlling the transformer 259. Thus between the two extreme ranges there is a range wherein control of the supercharger 300 is effected in response to the intake manifold pressure.

It will be readily seen that as the waste gate is closed the speed of the turbine will be increased and the supercharger will be driven by the turbine at an increased speed. An increase in the driving speed of the supercharger will effect an increase in the pressure supplied to the intake manifold which will cause the bellows 265 to further contract moving the rotor winding 271 into a position calling for less pressure and effecting through windings 207 and 208 of the induction switch 206, amplifier 215 and motor 220 movement of the throttle in a closing direction which will move the winding 201 toward the null position. When the throttle valve has reached this null point the combined voltages induced into the windings 331 and 337 will neutralize stopping the further opening of the waste gate 305.

Should the pressure within the intake manifold increase for any reason the bellows 265 will contract moving the rotor winding 271 in a direction calling for less pressure, whereupon the motor 220 will actuate the throttle 3 in a closing direction and causing a difference in the combined voltages induced in the windings 202 and 204 through the winding 201, and the combined voltages induced in the winding 331 and 337 by the alternating current in the rotor winding 336. This difference in voltage will effect the winding 321 of the motor 310 through the amplifier 350 in such a manner as to cause the motor 310 to rotate in a reverse direction tending to open the waste gate whereupon the turbine will be given by the exhaust gas from the engine 4 at a slower rate effecting a decrease in the intake manifold pressure to the selected value.

From the foregoing it will be readily seen that there is provided novel means operable through power control lever 1 for first positioning the throttle valve in accordance with a selected intake manifold pressure, and further novel means for increasing this intake manifold pressure upon the throttle being positioned in excess of a null point including novel means whereby the speed of the supercharger may be regulated in accordance with the intake manifold pressure so as to maintain the pressure selected through operation of the power control lever 1. The selection of the intake manifold pressure may be varied as desired within the range of the system.

OVERSPEED RESPONSIVE CONTROL CIRCUIT

Stabilization of the waste gate actuator or supercharger speed control means motor 310 is specifically provided by a control system 400 including an alternating current generator 401 driven by a shaft 402 from the supercharger turbine shaft 306 as shown and described in the said copending application Serial No. 561,083.

OPERATION

In operation, when the pilot through lever 1 moves rotor 77 according to a selected position, there is induced a certain combination of voltages in the stator windings 78, 79 and 80. These voltages are applied to the measuring follow-up transformers, for example, the follow-up transformer 259 in the manifold pressure control to thereby cause currents which produce a resultant field in its stator windings 260, 261 and 262.

If the position of rotor 271 of this follow-up transformer, determined by the manifold pressure acting on diaphragm 265, is such that the voltage induced in the follow-up rotor 271 is zero no control operation will be effected. If the rotor 271 is not in this position, as when the measured manifold pressure differs from the pilot's selection, there will be induced a voltage in the follow-up rotor winding 271 the phase of which is determined by the direction of coupling.

The voltage from single phase rotor 271 is then applied through conductors 282 and 283 to stator winding 207 of switch 206. This induces a corresponding voltage in rotor 208, which is carried by conductors 210 and 211 to the amplifier 215, the output of which amplifier feeds the secondary phase winding 221 of the two-phase throttle actuator 220. The other phase winding 222 of this motor 220 is connected to the main source of alternating current.

The phasing between these voltages in the motor windings is such that the motor 220 actuates the throttle through gear trains 241 and 244, and in such a direction that the resulting change in pressure causes the diaphragm 265 to actuate transformer 271 toward the null position.

The same principle of operation applies to the governor actuator, which includes a follow-up transformer 93 positioned by a two-phase motor connected to the output of amplifier 110 which operates as a direct follow-up from the pilot's control lever 1 and the transmitter 77.

This transformer 93 is electrically connected to the pilot's transmitter 77 in parallel with the manifold pressure transmitter 259, and if the position it measures differs from that sleected, it feeds a signal to the input of amplifier 110 by conductors 100 and 101 from its single phase rotor 94. The output of amplifier 110 leads to the secondary winding 113 of the two-phase governor actuator motor 114 to adjust the pitch of the propeller 146. The pitch of the propeller 146 being decreased as the selected manifold pressure is increased by movement of the control lever 1 in a clockwise direction.

In addition to the two-phase throttle actuator motor 220 there is provided the transformer 200 with rotor 201 and stator windings 202, 203 and 204. When the transformer 200 is used as a follow-up at small throttle openings, the voltage induced across the stator windings 202 and 203 thereof is compared with that induced across the stator windings 79 and 80 of the transmitter 76. The difference between these voltages is fed to stator winding 205 of induction switch 206, which through induction to rotor 208 is fed by conductors 211 and 210 to amplifier 215, and its output is fed by conductors 216 and 217 to the secondary winding 221 of the two-phase motor 220 to cause actuation thereof in the proper direction to position the throttle.

Whether the throttle actuator 220 is actuated as a direct follow-up from its connection with transmitter 76, or is actuated from connection with the pressure follow-up transformer 259 is determined automatically by cam 250 driven by the throttle actuator motor 220 through shaft 242, so as to control the position of the rotor 208 of inductance switch 206. The cam 250 is so shaped and so proportioned as to transfer from the direct follow-up connection with the transmitter 76 to a follow-up connection with the engine manifold pressure control follow-up transformer 259 at approximately 35 per cent open.

The transmitter 76 causes a direct follow-up adjustment of the throttle from zero to approximately thirty per cent open position and provides manually operable means for overcoming the effects which would otherwise be produced by controlling the throttle valve through the intake manifold pressure in view of the characteristic inversion of pressure at the intake manifold of an engine which occurs upon adjustment of the throttle valve to somewhat less than thirty per cent open. Moreover the latter manually operable means facilitates the starting of the engine.

Thus when moving the pilot's control lever 1 in the range corresponding to the zero to thirty per cent throttle valve open position, proportional opening of the throttle valve is accomplished and the throttle valve follows the position of the control lever 1.

When the throttle valve is in a position above thirty-five per cent open, the throttle valve is in pressure follow-up, that is, the same is positioned in accordance with the intake manifold pressure selected by the pilot's control lever 1.

When the throttle valve is between thirty per cent and thirty-five per cent open the signal to the amplifier 215 is a combination of position follow-up and pressure follow-up. The reason for the latter arrangement is to provide a smooth transition from the position follow-up to the pressure follow-up.

With reference to the throttle actuator motor 220 the rotor winding 201 of the rotary transformer 200 is arranged to induce a voltage in the stator windings 202 and 204 which are in turn connected to the stator windings 331 and 337 of the transformer 335. The rotor winding 336 of the transformer 335 is arranged to induce an opposing voltage in the latter stator windings 331 and 337. The difference between the said opposing voltages determines the direction of rotation of the motor 310. The said rotor windings 201 and 336 being so arranged that when the throttle valve is positioned below a predetermined null point of say about eighty per cent open the motor 310 will be actuated in a direction for opening the waste gate 305 so as to decrease the speed of the supercharger 300. Conversely, when the throttle valve is in a position more than the said null position of about eighty per cent open the motor 310 will be driven in a direction for closing the waste gate so as to increase the driving speed of the auxiliary supercharger and thereby the pressure within the intake manifold. Such operation thus regulates the boost pressure from the supercharger so that selected pressure can be maintained. However, upon the rotor winding 201 being returned to the null position due to the operation of the manifold pressure responsive means 265 and 259, operation of the motor 310 will cease.

During operation, it being remembered that the pressure follow-up transformer 259 is in control, if the pressure selected by the pilot through movement of the transmitter 76 is such that the throttle moves to more than the null position or about eighty per cent of the wide open position, the throttle transformer 200 causes a signal voltage to be transmitted to the amplifier 350, which in turn operates the two-phase waste-gate motor 310, to close the waste gate and increase the turbine speed. This will cause an increase in supercharger output, and therefore an increase in manifold pressure. This pressure operates through a manifold pressure responsive element 265 and it is connected to follow-up transformer 259 so as to cause the throttle to close slightly, until about eighty per cent open throttle position or the null position is reached. At this position, the transformer 200 in the throttle actuator and the transformer 335 induce neutralized signals to the follow-up motor 310.

Should the pilot now select a different pressure by moving the transmitter rotor 76, the measured manifold pressure and selected pressure will differ, and the throttle will then be moved to produce the desired value. Since the throttle actuator transformer 200 has moved from the null position, or from about eighty per cent open throttle position, it causes a signal to be transmitted to the waste gate actuator follow-up motor 310 to change its setting. Again the resulting change in manifold pressure will reset the throttle to its null or about eighty per cent open reference position.

If the selected pressure is such that the throttle is held in a position less than the null position, the system will hold the waste gate wide open. On the other hand, if a high pressure is selected, so that the turbine 301 is operating at top speed as limited by the overspeed control network 400, the throttle will be opened more than the null position to produce the selected pressure, or as near this pressure as can be produced with top speed of the turbine 301 and wide open throttle.

If the conditions are such that the turbine 301 is operating at any speed between its minimum (as determined with the waste gate wide open), and its maximum (as limited by the overspeed control of the circuit 400), the throttle will always be at the null position or about eighty per cent open, except during transients. The purpose of using this reference position, instead of waiting until the throttle valve is wide open before increasing the speed of the turbine is to have a means of immediately providing any required change in pressure without waiting for the turbine to accelerate and also allow for the time delay required for the air to flow to the engine. Without this feature, a selection of higher pressure for more power without moving the throttle valve would require closing of the waste gate and momentary loss of engine power due to higher exhaust pressure.

Further, in order to add stability to the system, a rate circuit is provided in the circuit 400 for preventing acceleration or deceleration of the supercharger in excess of a controlled limit, as disclosed in the said copending application Serial No. 561,083.

In case of failure of the system or the main alternating current supply, a combined electromagnetic and mechanical clutch is provided between the automatic throttle actuator means and the throttle valve, so that when power is on, the electromagnetic clutch is connected to the automatic throttle actuator means. If the power is turned off, the clutch 2 shifts the connection of the throttle from the automatic throttle actuator means to a mechanical connection for manual operation by lever 1 through clutch 2. When the power is turned off, a suitable spring, may be provided which will open the waste gate, and the propeller pitch governor will remain at the setting in which it happened to be at the time that the power was turned off.

NOVEL FEATURES

Supplemental fluid injection control

The present application relates to novel improvements in the aforenoted system of application Serial No. 561,083 and shown herein in Figure 1. These novel features are shown diagrammatically in Figures 2, 3, 4 and 5 in which like numerals indicate corresponding parts.

Referring to Figure 2, there is indicated by the numeral 501 a solenoid arranged to operate an armature 503 biased downwardly by a spring 505. The armature 503 operates an adjustable stop 507 pivoted at 509 so as to limit the adjustment of the main control lever 1 upon de-energization of the solenoid 501, while permitting a higher pressure setting by the control lever 1 upon energization of the solenoid 501. The solenoid 501 is electrically operated in conjunction with the usual supplemental or anti-knock fluid injection control of the engine which may be of a type shown in U. S. Patent No. 2,453,653 granted November 9, 1948, to Howard A. Alexanderson and assigned to Bendix Aviation Corporation. The supplemental fluid injection control is shown in Figure 2 as including a control valve 511 provided in a conduit 513 for the supplemental fluid and connected between a fluid supply pump and fluid metering device not shown. The valve 511 is arranged for "off" and "on" control of the supplemental fluid injection system. The valve 511 is shown herein as of an electromagnet controlled type having an electrical control circuit 515 including a source of electrical energy 516, the solenoid 501, and a switch 517 which is preferably mounted within the aircraft cabin for convenient operation by the pilot. Thus the supplemental fluid injection system may be placed in operation by the pilot closing the switch 517 so as to effect the opening of the valve 511 which would simultaneously effect energization of the solenoid 501 permitting the pilot to increase the selected intake manifold pressure. Conversely the valve 511 may be closed by opening the switch 517 so as to shut off the supplemental fluid injection system and de-energizing the solenoid 501 so that the spring 505 will actuate the stop 507 in a clockwise direction about the pivot 509. Such actuation of the stop 507 will cause the control lever to be moved in a counter-clockwise direction, as shown in Figure 2 by dotted lines, so as to decrease the pressure setting to within a safe "dry" operating range and limiting the travel of the control lever 1 in a clockwise pressure increasing direction.

Thus when the supplemental fluid injection system is used, the manifold pressure vs. R. P. M. schedule is extended to include operation of the supplemental fluid or water injection system.

Waste gate control

A further feature of the present invention over that disclosed by Figure 1 is illustrated in Figure 3 and claimed in copending divisional application Serial No. 110,819, filed August 17, 1949, and assigned to the assignee of the present application. In the improved system of Figure 3, the cam 380A is substituted for the cam 380 of Figure 1. In the latter arrangement, the throttle valve follow-up transformer 200, the waste gate follow-up transformer 335 and the cam 380A are so designed and adjusted that the waste gate will remain open for a substantial part of the throttle rotation from the closed position to, for example, a sixty per cent open position, the waste gate will then be closed by the motor 310 in proportion to the throttle valve position as the throttle valve is further opened until at a full open throttle valve position the waste gate will also be adjusted to a fully closed position.

It will be seen from the foregoing that the A. C. voltage from the throttle valve follow-up transformer 200 is the signal which controls the waste gate position. The transformer 200 in the latter arrangement is so set that when the throttle valve is fully closed the difference between the combined voltages inducted by transformers 200 and 335 is of such a phase that, when amplified and applied to the waste gate actuator motor 310, it will cause the motor to fully open the waste gate. As the throttle valve is opened this voltage falls to a minimum at a predetermined intermediate position of, for example, sixty per cent open throttle valve position, and then increase again substantially at 180 degrees out of phase as the throttle valve is opened past this intermediate position. This voltage when amplified and applied to the waste gate actuator motor 310 is then of such a phase as to cause the motor 310 to close the waste gate. Voltage from the resulting adjustment of the waste gate follow-up transformer 335 then counterbalances the voltage from the throttle valve follow-up transformer 200 so that the position of the waste gate in a closing direction follows the position of the throttle valve in an opening direction past the intermediate position. The rotor 336 of the waste gate follow-up transformer 335 is driven by the cam 380A secured to the actuator output shaft 320, and a cam follower 381 secured to the shaft 382 of the rotor 336.

The cam 380A is so shaped that upon adjustment of the waste gate in a closing direction in response to a signal voltage resulting upon a further closing movement of the throttle valve the cam 380A effects a follow-up adjustment of the rotor 336 of the transformer 335 so as to counterbalance the signal voltage and effect a proportional position relationship between throttle valve and waste gate.

The foregoing arrangement permits greater stability of control since the waste gate is actuated as a throttle valve position follow-up, rather than as an intake manifold pressure follow-up as in the disclosure of said application Serial No. 561,083.

*Multi-engine control*

There is further provided a novel single lever control for multi-engine operation. In the said application Serial No. 561,083, separate control levers were provided for the control system of each engine.

However, as shown in Figure 4 and disclosed and claimed in the said copending divisional application Serial No. 110,819, there may be provided a novel single lever control for the control systems of two or more engines supplying balanced power to an aircraft and there may be further provided novel means for selectively varying the power applied at one side or the other of the aircraft by such engines.

During take-off, the natural tendency is for a balanced power multi-engine aircraft to veer or turn from a fixed course due to engine torque or the direction of rotation of the propeller blades. In order to steer the airplane in a fixed direction under such conditions, the engine power at one side of the plane may be reduced so as to balance the tendency of the plane to veer. This expedient may also be used to overcome the tendency of cross winds to change the direction of the craft.

Referring to the drawing of Figure 4, there is illustrated diagrammatically the subject single lever control for a multi-engine aircraft. The control includes a shaft 550 to which may be imparted rotary motion to operate the master transmitter 76 which may include a standard rotor winding 77 inductively coupled to separate stator windings 78, 79 and 80 for each engine control system. As an alternate means, separate transmitters for each engine control system may be provided in which the rotors 77 of the respective transmitters are mechanically connected for rotation by the single control shaft 550 or as a further alternate arrangement a single master transmitter may be provided with the several receiver systems shown in Figures 1 and 3 connected in parallel thereto. As shown in Figure 4 the respective stator windings 78, 79 and 80 are so arranged that maximum coupling between the rotor 77 and each stator winding occurs at the same angular position of the rotor 77. Thus during normal operation, the respective engines controlled by the system provide balanced power to the aircraft at opposite sides thereof.

There is further provided in the line 211 of each of the engine control systems a winding 552 to which there may be inductively coupled a winding 554 connected across lines 63 and 64 of the main source of alternating current. The windings 554 are normally positioned at right angles to the windings 552, as indicated in Figure 4, and out of inductive relation with the winding 552.

However, upon axial movement of the control shaft 550 from the balanced position shown in Figure 4, one or the other of the windings 554 will be actuated through a lever 556 pivoted at 558 and bearing at one end upon a collar 560 formed on the shaft 550. A spring 562 biases the lever 556 into contacting relation with the collar 560, while a stop 564 limits the movement of the lever 556 toward the collar 560.

The opposite end of the lever 556 is linked at 566 to an arm 568 whereby rotary movement may be imparted to the rotary winding 554.

It will be seen from the foregoing that there is provided a mechanical arrangement whereby the rotor windings 554 may alternately be rotated through an angle. The windings 554 are so set that null or zero coupling exists between rotor winding 554 and stator winding 522 in the normal balanced position shown. Moreover upon axial movement of the shaft 550 from the null position rotation of one of the windings 554 is effected into coupling relation with the winding 552. The alternating voltage induced into the winding 552 is of such a phase as to cause upon amplification rotation of the actuator motor 229 in a throttle valve closing direction and thereby decrease the intake manifold pressure setting of the engine at one side of the aircraft without effecting the intake manifold pressure setting of the engine at the opposite side of the aircraft, since the other lever 556 is held from rotation by its stop 564. However axial movement of the shaft 550 in an opposite direction from the null position will similarly move the other rotor winding 554 from its null position so as to decrease the intake manifold pressure setting of the engine at the other side of the aircraft, without effecting the null position of the first mentioned rotor winding 554. Thus there is provided a novel intermittent drive whereby the intake manifold pressure in the engine or engines at one side of an aircraft may be reduced without effecting an increase in the intake manifold pressure setting of the engine or engines at the opposite side of the aircraft.

The stops 564 may be eliminated so that the intake manifold pressure of the engine or engines at one side of the aircraft is reduced while the intake manifold pressure of the engine or engines at the other side of the aircraft is increased upon axial movement of control shaft 550 to one side of the null position and thereby effecting unbalanced power to control the direction of the aircraft.

In the event there are provided more than one engine at opposite sides of the aircraft, each of the rotor windings 554 may be inductively coupled to stator windings corresponding to windings 552 in the control systems of the respective engines at one side of the aircraft so as to permit the power applied by the multi-engines to be unbalanced in like manner at the will of the operator through manipulation of the single power control shaft 550.

As a further alternate form of the invention, the main control lever, as shown in Figure 5, may be of the type shown in Figure 1 and indicated by the numeral 1 with the addition of a manually operable ball 570 mounted on the lever 1 and driving through a shaft 572 a pinion 574 engaging a rack 576 to impart axial movement to shaft 550 as described with reference to Figure 4. The lever 1 may be rotated with a shaft 580 in a suitable bearing. The shaft 580 is arranged concentric with the shaft 550 and there is slidably mounted in shaft 580 the rack 576. Thus the lever 1 may be manually operated to position through rod 70, the rotor 77 of the transmitter 76 for the respective engine control systems, as described and claimed in the said copending divisional application Serial No. 110,819. As disclosed and claimed in the present application, the lever 1 may be further limited by the stop 507 in response to the condition of the supplemental fluid injection system as heretofore described with reference to Figure 2.

It will be seen from the foregoing that any one or all of the foregoing improvements of Figures 2–4 and 5 may be applied to the basic system of Figure 1 and which basic system has been heretofore described and claimed in the said copending application Serial No. 561,083.

Although only three embodiments of the invention have been illustrated and described, various changes in the form and relative arrangements of the parts may be made to suit requirements.

What is claimed is:

1. For use with an induction system of a supercharged aircraft engine having operable means for injecting a supplemental fluid for suppressing predetonation of said engine; the combination comprising means for regulating said induction system so as to maintain the pressure thereof at a predetermined value, manually operable means, other means operated by said last mentioned means to select said pressure value, stop means limiting the range of adjustment of said manually operable means in a pressure increasing sense, and electrically operated means responsive to initiation of operation of said fluid injection means to affect said stop means so as to increase the range of pressure selection by said manually operable means.

2. For use with an induction system of a supercharged aircraft engine having operable means for injecting a supplemental fluid for suppressing predetonation of said engine; the combination comprising means for regulating said induction system so as to maintain the pressure thereof at a predetermined value, manually operable means to select said pressure value, stop means limiting the range of adjustment of said manually operable means in a pressure increasing sense, means responsive to initiation of operation of said fluid injection means to affect said stop means so as to increase the range of pressure selection by said manually operable means, and in which said stop means includes a lever, spring means to actuate said lever into a limiting position relative to the manually operable means and a solenoid to actuate said lever out of said limiting position.

3. For use with an induction system of a supercharged aircraft engine having operable means for injecting a supplemental fluid for suppressing predetonation of said engine; the combination comprising means for regulating said induction system so as to maintain the pressure thereof at a predetermined value, manually operable means to select said pressure value, stop means limiting the range of adjustment of said manually operable means in a pressure increasing sense, means responsive to initiation of operation of said fluid injection means to affect said stop means so as to increase the range of pressure selection by said manually operable means, and in which said manually operable means includes a lever operable by the pilot of the aircraft, said stop means includes a second lever, and a spring to actuate said second lever into a limiting relation with said pilot operated lever, and said operation responsive means includes a solenoid to actuate said lever out of said limiting relation in response to the initiation of operation of said supplemental fluid injection means.

4. For use with an induction system of a supercharged aircraft engine having operable means for injecting a supplemental fluid for suppressing predetonation of said engine; the combination comprising means for regulating said induction system so as to maintain the pressure thereof at a predetermined value, manually operable means to select said pressure value, stop means limiting the range of adjustment of said manually operable means in a pressure increasing sense, means responsive to initiation of operation of said fluid injection means to affect said stop means so as to increase the range of pressure selection by said manually operable means, and including a solenoid responsive to initiation of operation of the supplemental fluid injection means for actuating the stop means out of limiting relation with said manually operable means to permit an increase in the selected pressure value during operation of the supplemental fluid injection means, and spring means to actuate said stop means and thereby said manually operable means in a pressure decreasing direction upon cessation of operation of the supplemental fluid injection means.

5. For use with an aircraft having engines mounted at opposite sides thereof to normally supply a balance of power, each of said engines having operable means for injecting a supplemental fluid for suppressing predetonation of said engines, and each of said engines having a throttle valve to control the intake manifold pressure therefor; the combination comprising an actuator motor for each engine throttle, an intake manifold pressure responsive control for each actuator motor to maintain the intake manifold pressure of its associated engine at a preselected value, a manually operable pilot's control member, means operatively connected to said member to select said pressure upon adjustment of said member, stop means limiting adjustment of said pilot's control member in a pressure increasing direction, means responsive to initiation of operation of said fluid injection means to release said stop means and increase the range of pressure selection.

6. For use with an aircraft having engines mounted at opposite sides thereof to normally supply a balance of power, each of said engines having operable means for injecting a supplemental fluid for suppressing predetonation of said engines, and each of said engines having a throttle valve to control the intake manifold pressure therefor; the combination comprising an actuator motor for each engine throttle, an intake manifold pressure responsive control for each actuator motor to maintain the intake manifold pressure of its associated engine at a preselected value, a manually operable member including means to select said pressure upon rotation of said member, stop means limiting the rotary adjustment of said member in a pressure increasing direction, means responsive to initiation of operation of said fluid injection means to release said stop means and increase the range of pressure selection, in which said means to release the stop means includes a solenoid responsive to initiation of operation of the supplemental fluid injection means for actuating the stop means out of limiting relation with said manually operable member to permit an increase in the selected pressure value during operation of the supplemental fluid injection means, and spring means to actuate said stop means and thereby said manually operable member in a pressure decreasing direction upon cessation of operation of the supplemental fluid injection means.

7. For use with an induction system of a supercharged aircraft engine having operable means for injecting a supplemental fluid for suppressing predetonation of said engine; the combination comprising motor means for regulating the induction pressure of said engine, an induction pressure responsive control for said motor means to maintain the induction pressure of the engine at a preselected value, a manually operable pilot's control member, means operatively connected to said member to select said pressure upon adjustment of said member, stop means limiting adjustment of said pilot's control member in a pressure increasing direction, means responsive to initiation of operation of said fluid injection means to release said stop means and increase the range of pressure selection.

ALLEN W. BLANCHARD.

References Cited in the file of this patent

UNITED STATES PATENTS

| Number | Name | Date |
| --- | --- | --- |
| 1,784,671 | Jehle | Dec. 9, 1930 |
| 2,199,259 | Hersey | Apr. 30, 1940 |
| 2,381,429 | Bell et al. | Aug. 7, 1945 |
| 2,464,636 | Eaton | Mar. 15, 1949 |
| 2,491,482 | Dolza et al. | Dec. 20, 1949 |
| 2,491,484 | Dolza et al. | Dec. 20, 1949 |
| 2,491,497 | Jorgensen et al. | Dec. 20, 1949 |